United States Patent [19]

Iuchi

[11] Patent Number: 4,800,775
[45] Date of Patent: Jan. 31, 1989

[54] STEERING WHEEL

[75] Inventor: Yasuaki Iuchi, Aichi, Japan

[73] Assignee: Toyoda Gosei Co., Ltd., Nishikasugai, Japan

[21] Appl. No.: 62,602

[22] Filed: Jun. 16, 1987

[30] Foreign Application Priority Data

Aug. 9, 1986 [JP] Japan .................. 61-122609[U]
Oct. 29, 1986 [JP] Japan .................. 61-257849

[51] Int. Cl.$^4$ .................. B62D 1/04; G05G 1/10
[52] U.S. Cl. .................. 74/552; 29/159 B
[58] Field of Search .................. 74/552, 558; 29/159 B

[56] References Cited

U.S. PATENT DOCUMENTS

| 3,476,897 | 11/1969 | Vincent | 74/552 |
| 3,485,974 | 12/1969 | Wolf et al. | 74/552 |
| 4,280,372 | 7/1981 | Van Wicklin | 74/552 |
| 4,468,378 | 9/1984 | Takahara et al. | 74/552 |
| 4,581,954 | 4/1986 | Uchida | 74/558 |

FOREIGN PATENT DOCUMENTS

| 3542105 | 6/1986 | Fed. Rep. of Germany | 74/558 |
| 0151173 | 8/1985 | Japan | 74/558 |
| 2151239 | 7/1985 | United Kingdom | 74/558 |

Primary Examiner—Richard E. Moore
Assistant Examiner—Vinh Luong
Attorney, Agent, or Firm—Cushman, Darby & Cushman

[57] ABSTRACT

A steering wheel comprising a steering wheel core metal including a boss joined to the end of a steering shaft, a ring core metal and a spoke core metal for joining both of them, a hard resin insert that covers at least a portion of the steering wheel core metal, a soft coating layer that substantially covers the hard resin insert and the steering wheel core metal and a plurality of engaging recesses each formed with a narrower width on the side of an opening thereof and disposed at a predetermined interval in the surface of the hard resin insert for joining the hard resin insert and the soft coating layer, in which the resin of the soft coating layer intrudes into the resin recesses to join both of them. Peeling of the coating material applied to the resin insert can surely be prevented by provision of the engaging grooves. The engaging grooves can be formed with no special mechanisms and at a reduced cost, which enables the molding of the resin insert at a reduced cost and, thus, a decrease in the production cost of the steering wheel.

6 Claims, 5 Drawing Sheets

STEERING WHEEL

BACKGROUND OF THE INVENTION

This invention concerns a steering wheel in which a coating layer made of a soft synthetic resin is applied to a resin insert and a ring core metal disposed to a boss portion.

As steering wheels mounted to vehicles such as automobiles, there have been used those in which a coating layer is formed by applying coating material made of a soft synthetic resin to a pad or ring portion so as to provide a feeling of high quality and soft touch.

In conventional steering wheels, a soft coating layer such as one made of a soft vinyl chloride resin, or foamed urethane resin is sometimes formed onto the outer circumference of a core metal. However, since the soft coating layer itself is soft, no favorable feeling can be obtained upon gripping the ring, causing a feeling of collapse or displacement relative to to the core metal at the inside. Accordingly, as a countermeasure for avoiding the displacement of the soft coating layer relative to the core metal, there have been used such means as adhesive bonding for securing both of them, use of a core metal form with a circumferential groove for providing an anti-rotation characteristic, or use of a core metal disposed with a hard coating layer and a continuous groove formed in the circumferential direction along the core metal between the core metal and the soft coating layer for providing the anti-rotation characteristic.

In the case of forming a hard resin such as a polypropylene resin and acetylcellose to the outer circumference of the core metal, since the hard coating layer itself is rigid, it causes neither a feeling of collapse nor of displacement relative to the core metal.

In recent years, higher quality has been demanded more and more for automobiles and it has been intended to cover as far as the boss cover below the pad portion with a soft synthetic resin. Further, in the case of using, for example, a PVC resin as the coating material made of a soft synthetic resin, peeling from the end portion is liable to occur between the resin insert and the coating material by merely laminating the material to the resin insert disposed to the boss portion, since the coating material is soft and, therefor, the provision of peeling-preventive means is required for them.

Then, the peeling-preventive measures are taken generally as indicated below.

That is, a through hole is disposed to the rising wall in perpendicular to the rising wall of the resin insert, the coating material is intruded to the portion at the inside of the rising wall corresponding to the through hole and caused to flow to the inside of the through hole, thereby connecting the coating layer at the outer circumferential surface with the coating layer at the inner side.

In the case of using adhesives between the core metal of the ring and the soft coating layer in the prior art described above, pre-treatment for the application of the adhesives such as degreasing of the core metal or the maintenance and the handling of the adhesives become troublesome because they increase the manufacturing cost for the steering wheel. Further, in the case of using a continuous circumferential groove formed into the core metal itself or the hard coating layer, there has been a problem that although no rotation (displacement) occurs between it and the soft coating layer formed onto the outer circumference thereof in the direction in perpendicular to the circumferential direction of the ring due to the groove formed continuously described above, the groove is of no use for preventing the soft coating layer from displacing relative to the circumferential direction of the ring portion.

While on the other hand, in the case of laminating the coating material to the resin insert disposed on the boss portion, since the rising wall of the resin insert is formed usually in parallel with the direction of opening and closing a die in view of the molding work and the design, a special mechanism such as a slide core has to be provided on the die itself for forming a through hole in perpendicular to the rising wall simultaneously with the injection molding of the resin insert, which increases the manufacturing cost for the die and leads to an increase in the production cost of the steering wheel.

SUMMARY OF THE INVENTION

In order to overcome the foregoing problems, this invention adopts a steering wheel in which a hard coating layer is formed on a ring core metal and a soft coating layer is formed on the outer circumference of the hard coating layer, wherein a plurality of recesses are disposed at a predetermined interval in the hard coating layer for preventing the displacement of the soft coating layer.

Further, for manufacturing a steering wheel capable of preventing peeling between the resin insert and the coating layer by a simple die structure and at a reduced cost, this invention employs means in the resin insert for the boss portion, in that engaging grooves each having an engaging portion are disposed to the inside of the rising wall of the resin insert in parallel with the standing direction of the rising wall.

In the steering wheel according to this invention, a hard coating layer is formed on the outer circumference of the core metal in the ring and a soft coating layer is formed further on the outer circumference thereof.

Upon molding the hard coating layer, recesses are formed circumferentially at a predetermined interval in the hard coating layer and, upon molding the soft coating layer, it is formed in such a way that the resin is partially intruded to the recesses formed at a predetermined interval in the hard coating layer.

Accordingly, the soft coating layer displaces neither in the circumferential direction nor in the direction perpendicular to the circumferential direction and can surely be engaged with the hard coating layer without using adhesives, thus no displacement of the core metal results and the structure can provide a preferable feeling of grip upon gripping the ring.

In a case where the coating layer is integrally coated onto the resin insert, since the engaging grooves each provided with the engaging portion are formed onto the inner side of the rising wall of the resin insert in parallel with the standing direction of the rising wall, the coating member covering the above-mentioned portion is partially engaged by the engaging portions of the engaging grooves thereby preventing peeling between the coating layer and the resin insert.

BRIEF DESCRIPTION OF THE DRAWINGS

FIG. 6 is a perspective view of the recess 6a;

FIG. 7 is a front elevational view of the recess 6a;

DETAILED DESCRIPTION OF THE PREFERRED EMBODIMENT

Description will be made of the ring in the steering wheel according to this invention while referring to one embodiment shown in FIGS. 1 through 7.

Figure 1:
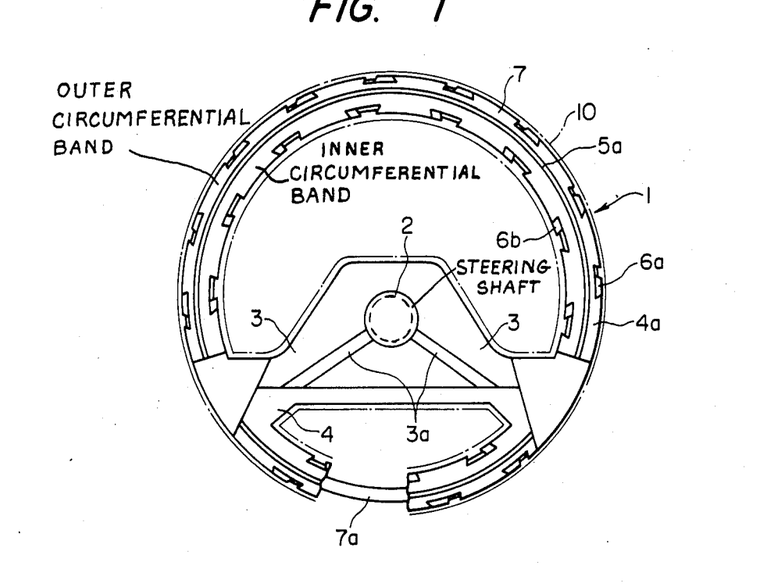
FIG. 1 is a plan view of a steering wheel according to this invention.

A steering wheel 1 according to this invention comprises a steering wheel core metal including a boss joined to the end of a steering shafts, a ring core metal and a spoke core metal that joins the boss to the ring core metal. In this invention, a hard coating layer 4 is formed on the outer circumference of the steering wheel core metal and a soft coating layer 10 is formed on its outer circumference. FIG. 1 shows the entire portion of the steering wheel 1, which includes a cylindrical boss 2 secured by way of a nut to a steering shafts, a spoke 3 secured to the boss 2 and having a spoke core metal 3a extended substantially in a diverged configuration, and a ring 7 supported by the spoke 3.

The hard coating layer 4 is formed on the boss 2, the spoke portion 3 and the ring 7 and glass fiber-incorporated polypropylene resin (PP) is used as the material therefor.

Figure 2:
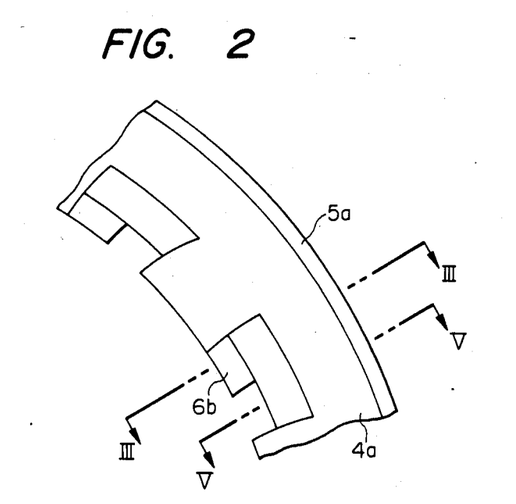
FIG. 2 is a perspective view of a the ring portion of the core metal thereof.

A hard coating layer 4a for the ring is formed on the outer circumference of the ring core metal 7a and a groove 5a is formed circumferentially in the upper portion of the hard coating layer 4a of the ring.

Engaging recesses 6a are disposed at a predetermined interval in the outer circumference of the hard coating layer 4a in the ring and engaging recesses 6b are formed at a predetermined distance in the inner circumference of the hard coating layer 4a of the ring as well.

Figure 6:
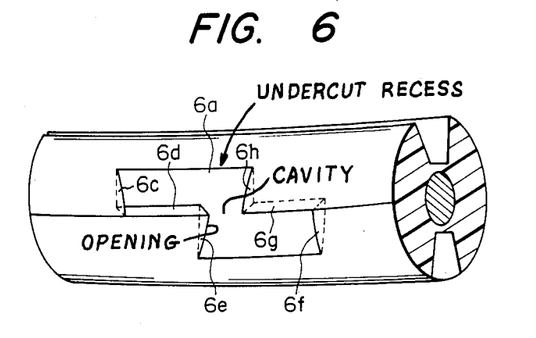

The engaging recesses 6a and 6b have a configuration, for example, as shown in FIG. 6, in which two trapezoidal grooves are communicated vertically (i.e., laterally) with each other. There are formed a first engaging portion 6c, a second engaging portion 6d, a third engaging portion 6e, a fourth engaging portion 6f, a fifth engaging portion 6g and a sixth engaging portion 6h.

Figure 7:
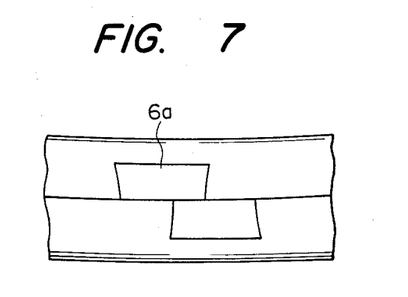

The engaging portion 6a, when viewed from the outside, has a trapezoidal configuration as shown in FIG. 7, in which the upper-half is a trapezoidal shape, while the lower-half is an trapezoidal shape and the upper-half and the lower-half trapezoides are formed so as to be displaced from each other by about one-half of the base length of the trapezoid in the circumferential direction.

The shape for the engaging recesses 6a, 6b maybe formed such that the upper-half trapezoidal is aligned with the lower-half trapezoid, or the engaging recess 6a at the outer circumference is formed while being displaced by one-half as shown in FIG. 7, while the engaging recess 6b at the inner circumference is formed in the aligned state.

Further, the positional relationship between the engaging recess 6a disposed in the outer circumference and the engaging recess 6b disposed in the inner circumference may be such that they are disposed at an identical position, mating to each other, or disposed alternately. Further, the number of them maybe of about 13-15 per steering wheel and the effect of preventing the displacement of the soft coating layer formed on the outer circumference is increased as the number is increased.

Figure 3:
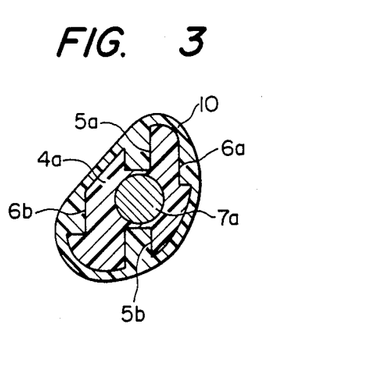
FIG. 3 is a cross-sectional view taken along line A—A, but at a stage after a coating of resin has been molded onto the core.

Further, a groove 5a is formed in the upper portion of the hard coating layer 4a of the ring as shown in FIG. 2. In the cross-section of the ring 7 in this embodiment (III—III cross-section in FIG. 2), as shown in FIG. 3, the groove portion 5a is formed in the upper portion, while the groove portion 5b is formed in the lower portion of the hard coating layer 4a for the ring, whereas the engaging recess 6a is formed in the upper portion on the outer circumference, while the engaging recess 6b is formed in the lower portion on the inner circumference of the hard coating layer 4a for the ring, and the ring core metal 7 is formed at the center.

Figures 4, 5:
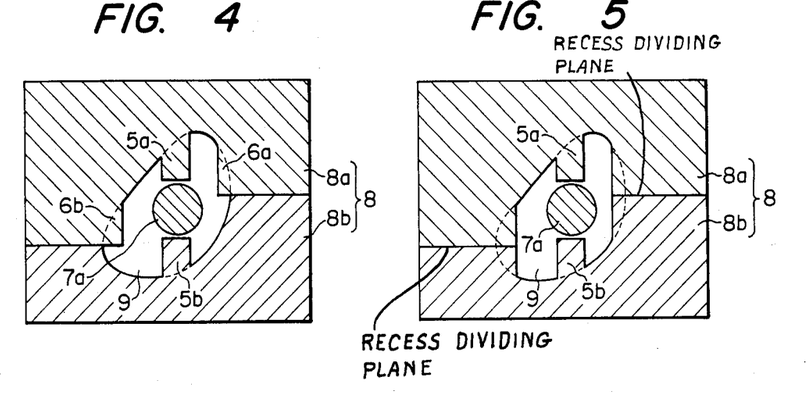
FIG. 4 is a cross-sectional view of a die corresponding to the cross-section A—A in FIG. 2.
FIG. 5 is a cross-sectional view of a die corresponding to the cross section B—B in FIG. 2.

The cross-section of a die 8 for injection molding the hard coating layer 4a for the ring (cross-section corresponding to the cross-section III—III in FIG. 2) comprises a stationary die 8a situated on the upper side and a movable die 8b situated on the lower side, and the hard coating layer 4a for the ring is injection molded in a cavity 9 between the two dies as shown in FIG. 4.

Further, in another cross-section of the die 8 (cross-section corresponding to the cross-section V—V in FIG. 2), the stationary die 8a and the movable die 8b are abutted against each other at the portion corresponding to the recesses 6a, 6b as shown in FIG. 5 different from the cross-section as described above (cross section corresponding to the cross-section III—III in FIG. 2), by which the upper trapezoidal shape and the lower trapezoidal shape in the engaging recesses 6a, 6b are contiguous with each other.

Since the engaging recesses 6a, 6b and the grooves 5a, 5b are constituted as described above, the hard coating layer 4 includes no undercut portions and the hard coating layer 4 of the molding product can be released smoothly from the die 8 upon releasing the hard coating layer 4 by displacing the movable die 8b after the molding has been accomplished.

Then, the coat coating layer 10 made of a soft polyvinyl chloride resin is formed onto the outer circumferential surface of the hard coating layer 4. In this case, a portion of the soft coating layer 10 intrudes into the recesses 6a, 6b and the grooves 5a, 5b to prevent the displacement of the soft coating layer 10 to the hard coating layer 4. Particularly, since the engaging recesses 6a, 6b each have a trapezoidal shape towards the outside and the inside of the ring portion 7 as shown in FIG. 1, an anchoring effect is exerted due to the intrusion of the soft coating layer 10, making the joining between the hard coating layer 4 and the soft coating layer 10 more stronger.

Further, it is also possible to apply a coating film such as of a urethane-type paint, as required onto the surface of the soft coating layer 10. By applying such a coating film, the surface of the steering wheel is made excellent in regard to abrasion resistance, the satin-like pattern at the surface is not erased and the sticky feeling at the surface is eliminated, to provide favorable feeling.

Description will be made of the operation of the embodiment as described above.

Upon manufacturing the steering wheel of this embodiment, a hard coating layer 4 made of PP incorporated with glass fibers is formed by means of injection molding onto the steering wheel core metal joined with the boss 2, the spoke core metal 3a and the ring core metal 7a. That is, the steering wheel core metal described above is set as an insert into the cavity 9 formed between the stationary mold 8a and the movable mold 8b as shown in FIG. 4 or FIG. 5, glass fiber-incorporated PP melted under heating is injected and filled into the cavity 9. Then, the glass fiber-incorporated PP in the cavity 9 is cooled to solidify it, and the molding product molded to a predetermined shape covers the steering wheel core metal to constitute the hard coating layer 4.

Successively, the steering wheel core metal applied with the hard coating layer 4 is taken out from the die 8, where the molding product can easily be released in the vertical direction from the movable die 8b and the stationary die 8a since the engaging recesses 6a, 6b include no undercut portions to the molding die 8.

Since the hard coating layer 4 thus obtained has the first engaging face 6c, the third engaging face 6e, the fourth engaging face 6f and the sixth engaging face 6h in the circumferential direction, while having the second engaging face 6d and the fifth engaging face 6g in the direction perpendicular to the circumferential direction respectively, the layer is engaged with the soft coating layer 10 made of soft polyvinyl chloride resin that covers the outer circumference of the hard coating layer 4 at their respective engaging surfaces and, accordingly, the soft coating layer 10 displaces neither in the circumferential direction nor in the direction perpendicular to the circumferential direction relative to the hard coating layer 4.

Then, a urethane resin type paint is applied to the surface of the soft coating layer to complete a steering wheel.

This invention is no way limited to the embodiment as described above but can also be constituted as below.

(1) Although a glass fiber-incorporated polypropylene is used in the above-mentioned embodiment, other olefin-type resins can also be used.

(2) Although the soft polyvinyl chloride resin is used in the above-mentioned embodiment for the soft coating layer 10, polyurethane resins, as well as foaming products of polyurethane resin or polyvinyl chloride resin may also be used.

Description will be made of this invention referring to one embodiment applied to the resin insert of a steering wheel for use in automobiles referring to FIGS. 8 through 12.

Figure 9:
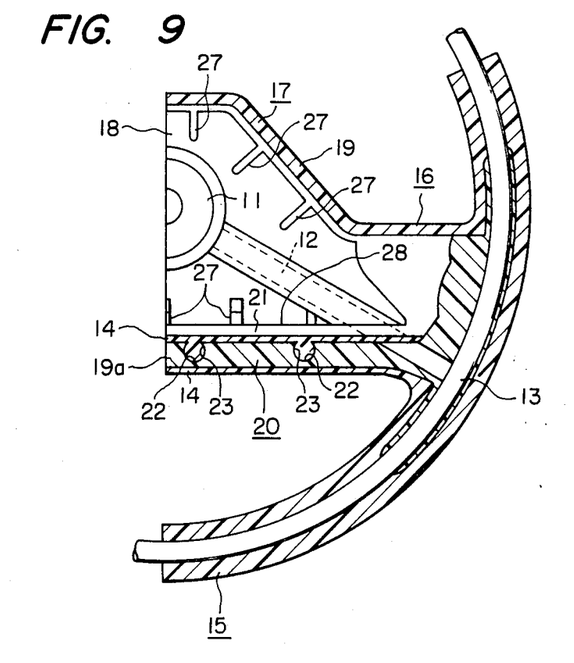
FIG. 9 is a fragmentary front elevational view of a steering wheel in which the resin insert and the ring portion are illustrated in a transversal cross-section.
Figure 10:
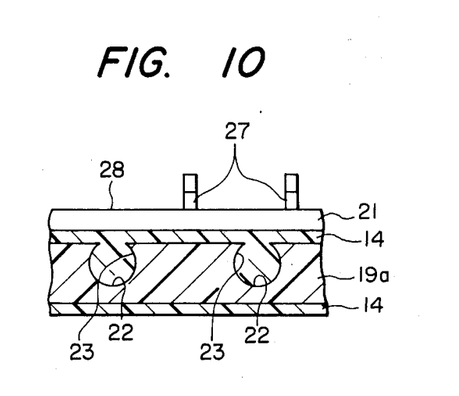
FIG. 10 is an enlarged transversal cross-sectional view of a portion of the lower rising wall shown in FIG. 9.
Figure 11:
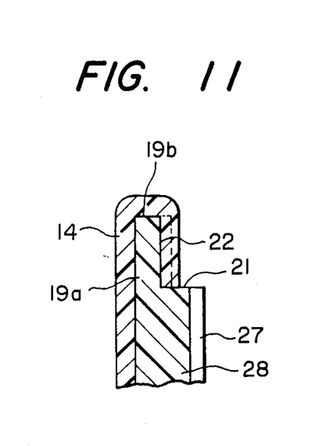
FIG. 11 is a enlarged longitudinal cross-sectional view of a portion of the lower rising wall shown in FIG. 9.

As shown in FIG. 9, a rod-like spoke core metal 12 is secured by way of welding or the like to the outer circumference of a boss 11 to which the steering shaft is fitted, and a ring core metal 13 formed on the ring is secured also by means of welding or the like to the top end of the spoke core metals 12.

A coating layer 14 made of a PVC (polyvinyl chloride) resin is integrally coated to form a covering by way of insert injection molding onto the boss 11, in which the spoke core metal 12 and the ring core metal 13 by using the boss 11, the spoke core metal 12, the ring core metal 13 and a resin insert 20 described later are used as the insert. The ring core metal 13 and the coating layer 14 constitute a ring 15, while the spoke 12, the preliminary molded resin insert 20 and the coating layer 14 constitute the spoke 16. Further, the resin insert 20 made of a glass fiber-incorporated PP (polypropylene) resin constituted with a disk-like bottom face 18 and a cylindrical rising wall 19 extended from the bottom face 18 to the spoke 6 covering the boss 11 is premolded by way of injection molding onto the periphery of the boss 11, and reinforcing ribs 27 for the rising wall 19 are disposed onto the inner surface of the rising wall 19 of the resin insert 20. The standing direction of the rising wall 19 corresponds to the mold-opening and closing direction in the injection molding die for the preliminary molding, while the bottom face 18 formed in parallel with the bottom of the boss 11 is perpendicular to the mold opening and closing direction. In the rising wall 19, a thick wall portion 28 for reinforcing the lower rising wall 19a is formed on the bottom face 18 substantially at the center of the inner surface of the lower rising wall 19a situated below, and a step 21 is formed at the boundary between the thick wall portion 28 and the lower rising wall 19a. Then, the boss 11, the resin insert 20 and the coating layer 14 covering the outer circumference of the resin insert 20 constitute a boss cover 17 (the coating layer 14 for the boss cover 17 is not illustrated in FIG. 8).

Figure 12:
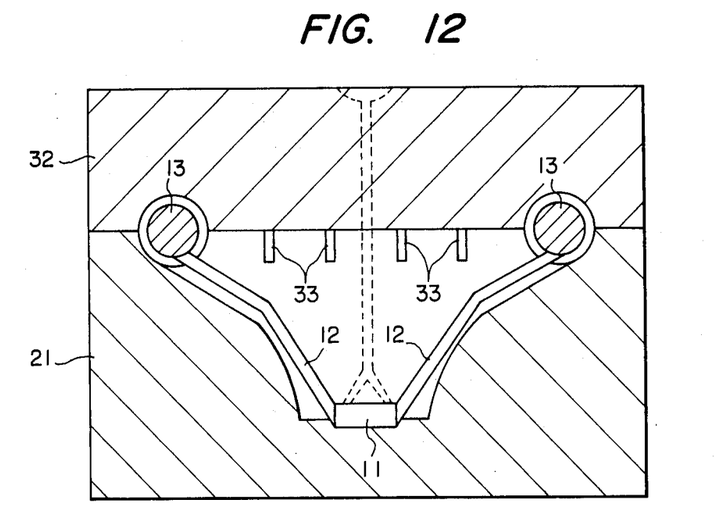
FIG. 12 is a longitudinal cross-sectional view illustrating an injection molding die for forming the engaging groove of the rising wall of the resin insert.

The resin insert 20 is formed upon preliminary molding, as shown in FIG. 12, by setting a portion of the ring core metal 13, the spoke core metal 12 and the boss 11 as the insert into an injection molding die for use in preliminary molding and by subjecting the glass fiber-incorporated PP (polypropylene) resin as the polyolefin type resin to the insert injection molding. In this case, the bottom of the boss 11 is disposed on the molding surface of a stationary die 31 for the preliminary molding of the resin insert 20 so as to be in perpendicular to the mold-opening and-closing direction of the preliminary molding die, and four groove-forming pins 32 aligned with the mold-opening and-closing direction are stood vertically to the molding surface of the movable die 32 at a portion where the rising wall 19 of the resin insert 20 is formed.

Then, when the die is closed by actuating the movable die 32 and the molten glass fiber-incorporated PP resin is injected, the resin insert 20 is preliminarily molded to the core metal and engaging grooves 12 extended from opening edge 19b to the step portion 21 are formed on the inner surface of the lower rising wall 19a thereof.

Figure 8:
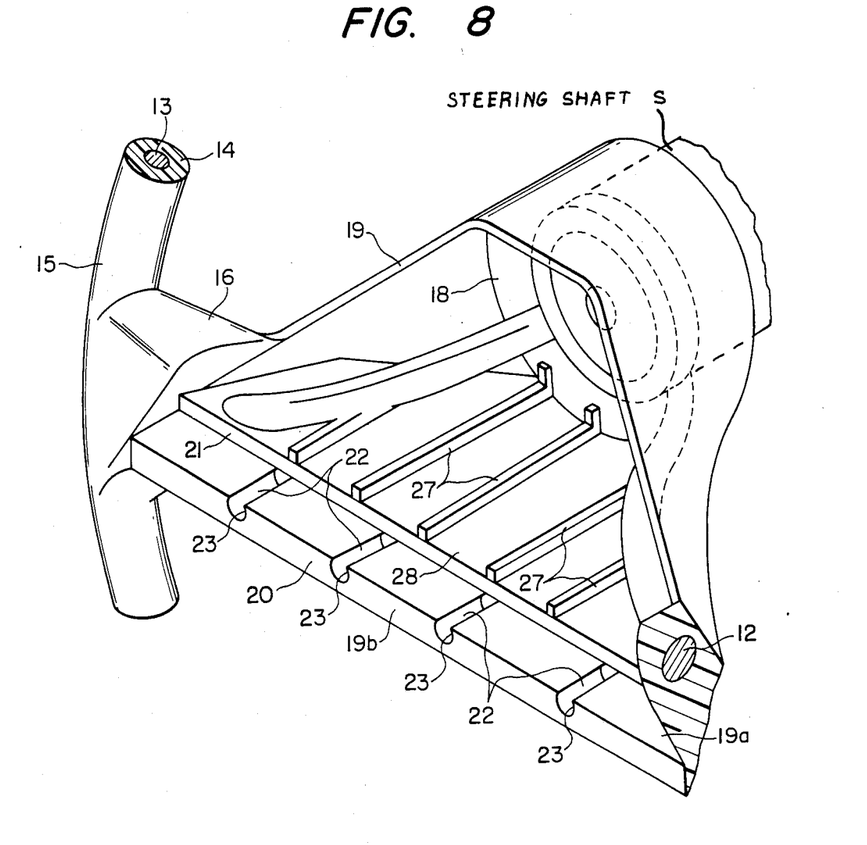
FIG. 8 is a perspective view of a portion of a steering wheel illustrating the resin insert of a steering wheel of an embodiment according to this invention.

As shown in FIG. 8, the four engaging recesses 22 extended on the step portion 21 are formed in the opening edge 19b of the lower rising wall 19a at a predetermined interval, and each of the engaging recesses 22 is formed in parallel with the standing direction of the rising wall 19. The engaging recess 22 has a substantially circular transversal cross-section in which the width of the opening is narrower than the central portion of the engaging groove 22, and an engaging portion 23 for engaging the coating layer 13 is formed at a portion between the central portion and the opening. Accordingly, the engaging recess 22 is aligned with the mold-opening and-closing direction of the injection molding die for the preliminary molding of the resin insert 20.

Then, the core metal to which the resin insert 20 has been disposed by the preliminary molding is set into the molding die for the coating layer 14 and the coating layer 14 made of a PVC resin to be injection molded thereon. In this case, since the PVC resin of the coating layer 14 is filled throughout the engaging recess 22 at the portion of the engaging recess 22 and the resin is engaged by the engaging portion 23, the coating layer 14 is prevented from being detached from the opening of the edge 19b of the lower rising wall 19. Accordingly, the coating layer 14 can firmly be joined to the resin insert 20 made of the glass fiber-incorporated PP resin (which conventionally provides poor adhesion) without using adhesives, as well as the coating layer 14 can be prevented from peeling at the opening edge 19b of the rising wall 19.

As has been described above, according to this embodiment, since the engaging recesses 22 for engaging the coating layer 14 are disposed in the resin insert 20 at the inner surface of the lower rising wall 19a, the coating layer 14 can be prevented from peeling at the opening edge 19b of the rising wall 19. Further, this embodiment is particularly effective for a resin insert 20 made of the glass fiber-incorporated PP resin which is a polyolefinic resin of poor adhesive property by nature.

Further, since the engaging recesses 22 are disposed so as to agree with the mold-opening and-closing direction of the injection molding die for forming the resin insert 20, it is only necessary to provide the groove-forming pins 33 to the movable die 32 and provision of special mechanism such as a slide core for the die as in the usual case is no more necessary, whereby the molding die can be manufactured at a reduced cost and, accordingly, the steering wheel can be produced at a reduced cost.

This invention is no way limited only to the embodiment as described above but it can also be modified and embodied as described below.

Figure 13:
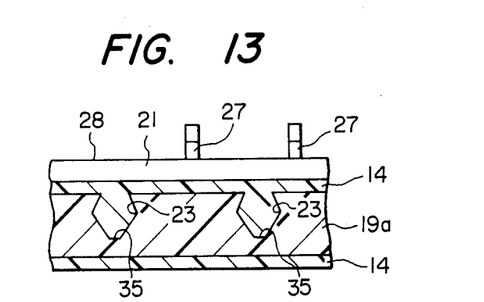
FIGS. 13 and 14 are enlarged transversal cross-sectional views showing other embodiments of the engaging groove.
Figure 14:
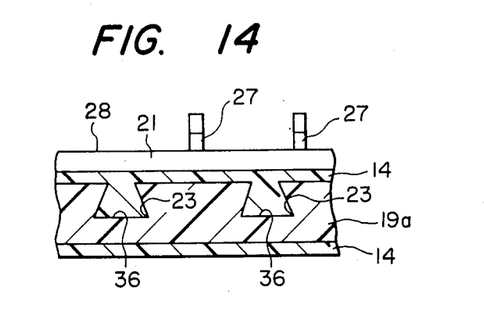

(1) The engaging recesses 22 may be formed into an engaging groove 35 of a hexagonal transversal cross-section as shown in FIG. 13, or into the engaging groove 36 of a trapezoidal transversal cross-section as shown in FIG. 14, in addition to the circular shape as in this embodiment, and any other cross-sectional shapes may also be employed so long as the width at the opening is smaller than the width at other portions.

(2) Although the engaging recesses 22 are disposed in the resin insert 20 only at the lower rising wall 19a in the foregoing embodiment, they may be disposed in other portions of the rising wall 19.

(3) The number of the engaging recesses 22 may be from 1 to 3 or 5 or greater in addition to four in this embodiment, and the length of the engaging recess 22 toward the bottom face 8 may be varied optionally in accordance with the number thereof.

(4) Although the resin insert 20 is disposed by the preliminary molding onto the entire circumference of the core metal as shown in the foregoing embodiment, it is also possible to mold only the resin insert 20 by a separate die and set this insert together with the insert core metal upon molding the coating layer 4. The engaging recesses 22 are of course disposed also in the resin insert 20 in this case.

As has been described above specifically according to this invention, since the peeling of the coating material applied to the resin insert can surely be prevented and the engaging grooves can be formed without using a conventional slide core or like other mechanism, it can provide an excellent effect that the die for the molding of the resin inert can be manufactured at a reduced cost.

I claim:

1. A steering wheel, comprising:
    a steering wheel core metal including a plurality of members, including a boss for joining the steering wheel to an end of a steering wheel shaft, a ring-shaped ring core metal having a circumferentially-extending radially outer circumferential band-shaped outer circumferential region and a circumferentially-extending radially inner circumferential band-shaped inner circumferential region, and a spoke core metal joining said ring core metal with said boss;
    a hard resin insert fixed upon and covering at least a portion of said steering wheel core metal;
    a plurality of recesses formed in said hard resin insert, said recesses being spaced from one another along at least one said member of said steering wheel core metal and each including an internal cavity and an opening into said cavity from externally of said hard resin insert, each said opening being narrower in at least one direction than is the respective recess within said cavity thereof; and
    a soft coating layer substantially covering said hard resin insert and said steering wheel core metal and intruding into said recesses through said openings for thereby joining said soft coating layer to said hard resin insert for restricting movement of said soft coating layer along and around said members of said steering wheel core metal.

2. The steering wheel of claim 1, wherein:
    at least some of said recesses are spaced from one another along an axially extending wall of said boss of said steering core metal in a portion of said hard resin insert fixed upon and covering at least a portion of said boss of said steering wheel core metal.

3. The steering wheel of claim 1, wherein:
    at least some of said recesses are spaced from one another along said ring-shaped ring core metal in two groups disposed in a portion of said hard resin insert fixed upon and covering at least a portion of said ring-shaped ring core metal, one of said two groups being disposed upon said outer circumferential region of said ring-shaped ring core metal and the other of said two groups being disposed upon said inner circumferential region of said ring-shaped ring core metal.

4. The steering wheel of claim 3, wherein:
    each recess is of constant transverse cross-sectional size and shape in both axially opposite directions from a respective imaginary plane which divides that recess in two and extends transversally of a longitudinal axis of said steering wheel.

5. The steering wheel of claim 4, wherein:
    each said recess is provided in two axially adjoining portions which are offset from one another along said ring-shaped ring core member circumferentially of said ring-shaped ring core member by an amount equal to a fraction which is less than one times the length of either portion of said recess circumferentially of said ring-shaped ring core member.

6. The steering wheel of claim 1, wherein: each recess is of constant transverse cross-sectional size and shape in both axially opposite directions from a respective imaginary plane which divides that recess in two and extends transversally of a longitudinal axis of said steering wheel.

* * * * *